Figure 1:
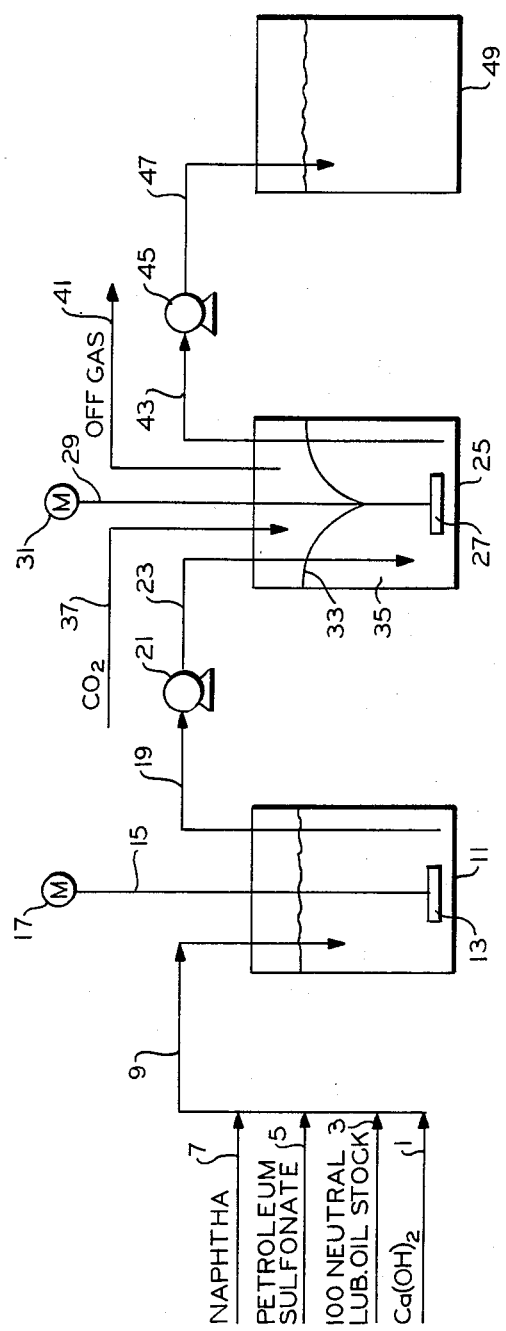

United States Patent [19]

Spence

[11] Patent Number: 4,541,940
[45] Date of Patent: Sep. 17, 1985

[54] STIRRED VORTEX TANK REACTOR AND METHOD OF CO₂ ADDITION FOR PRODUCING OVERBASED PETROLEUM SULFONATE

[75] Inventor: J. Ronald Spence, Bartlesville, Okla.

[73] Assignee: Phillips Petroleum Company, Bartlesville, Okla.

[21] Appl. No.: 594,660

[22] Filed: Mar. 28, 1984

[51] Int. Cl.⁴ ............................................. C10M 1/40
[52] U.S. Cl. ........................................ 252/33; 252/18
[58] Field of Search ..................................... 252/33, 18

[56] References Cited

U.S. PATENT DOCUMENTS

| | | | |
|---|---|---|---|
| 3,318,809 | 5/1967 | Bray | 252/33 |
| 3,384,585 | 5/1968 | Gragson et al. | 252/33 |
| 3,523,899 | 8/1970 | DeVault | 252/33 |
| 3,658,703 | 4/1972 | Gragson et al. | 252/33 |
| 3,806,454 | 4/1974 | Sias | 252/33 |
| 3,830,739 | 8/1974 | Kemp | 252/33 |
| 3,878,116 | 4/1975 | Ruechert | 252/33 |
| 4,137,186 | 1/1979 | Sabol | 252/33 |
| 4,165,291 | 8/1979 | Gragson | 252/33 |

Primary Examiner—Jacqueline V. Howard
Attorney, Agent, or Firm—A. W. Umphlett

[57] ABSTRACT

A method and apparatus for the production of overbased petroleum sulfonate in which $CO_2$ is contacted at reaction conditions with a reaction mixture of petroleum sulfonate, lube oil, $Ca(OH)_2$, MeOH, and naphtha in the vapor space at the vortex surface of a stirred tank vortex reactor.

4 Claims, 1 Drawing Figure

STIRRED VORTEX TANK REACTOR AND METHOD OF $CO_2$ ADDITION FOR PRODUCING OVERBASED PETROLEUM SULFONATE

BACKGROUND OF THE INVENTION

This invention relates to overbasing a calcium petroleum sulfonate. In another of its aspects this invention relates to the preparation of a lubricating oil additive. In still another of its aspects this invention relates to the production of calcium petroleum sulfonate having a high total base number (TBN) for use as an additive in lubricating oils, particularly crankcase oils for internal combustion engines to impart detergency and reduce sludge formation.

In one of its concepts this invention provides a process for overbasing a calcium petroleum sulfonate by manipulation of process steps or process conditions, particularly the addition of carbon dioxide, to provide a product having a TBN in desirable range.

Among the materials that impart detergency to lubricating oils thereby being of assistance in keeping internal engine parts clean and reducing sludge formation in the oil are overbased calcium petroleum sulfonates. These sulfonates are known to be useful as additives for lubricating oils, particularly crankcase oils for internal combustion engines.

It is known that equivalent detergency characteristics can be obtained with a lower concentration of additive in a lubricating oil—the higher the alkaline reserve of an additive: the larger the quantity of acidic combustion products accumulated in the oil to which the additive is added that can be neutralized by the additive. The measurement of alkaline reserve is reported as total base number (TBN) which is the number of milligrams of potassium hydroxide equivalent to the amount of acid required to neutralize the alkaline constituents present in one gram of sample. An additive having a total base number higher than can be obtained from calcium petroleum sulfonate alone is commonly said to be "overbased" or, alternatively, is said to be "superbasic".

Petroleum sulfonic acid which is neutralized to form petroleum sulfonates normally includes appreciable amounts of various hydrocarbons not having the acid group capable of forming the sulfonate so that the resulting product is a mixture of hydrocarbons and petroleum sulfonates. When the sulfonic acid is neutralized with an excess of CaO or $Ca(OH)_2$ to form the sulfonate, the resulting product has a relatively small alkaline reserve. The addition of a large excess of neutralizing material normally does not materially increase the alkaline reserve since the excess material is removed, usually by filtration, prior to the use of the sulfonate in a lubricant. The previously known processes for overbasing calcium petroleum sulfonates have experienced difficulty in obtaining sufficiently high alkaline reserves, e.g., TBN of 300 mg KOH/gm or higher, to enable the formulator to use lower amounts of additive while maintaining equivalent detergency or to protect the engine adequately under conditions of high acid formation in the combustion process.

It has now been discovered that overbased petroleum sulfonate having a TBN in the desirable range above 300 can be produced using a stirred tank vortex batch reactor. Comparison of results using $CO_2$ sparging below the surface of the reaction mixture and reaction of $CO_2$ at a vortex surface in the reactor shows that TBN above 300 can be reliably produced using the vortex method while TBN of 300 was not obtained by $CO_2$ sparging.

It is therefore an object of this invention to provide an overbased calcium petroleum sulfonate having high alkaline reserve. It is another object of this invention to provide lubricating additive containing overbased calcium petroleum sulfonate having high alkaline reserve. It is another object of the invention to provide a process for preparing an overbased calcium petroleum sulfonate having high alkaline reserve. It is still another object of this invention to provide a process for preparing a lubricating additive containing overbased calcium petroleum sulfonate having a high alkaline reserve.

Other aspects, concepts, and objects of this invention along with its several advantages will be apparent from a study of this disclosure and the appended claims.

STATEMENT OF THE INVENTION

According to this invention there is supplied a method for producing overbased petroleum sulfonate comprising contacting carbon dioxide with a reaction mixture of (1) petroleum sulfonate, (2) lube oil, (3) $Ca(OH)_2$, (4) MeOH, and (5) naphtha at a vortex surface of a stirred tank vortex reactor.

In an embodiment of this invention an apparatus is provided for producing overbased petroleum sulfonate. The essential apparatus is a stirred vortex tank reactor having (1) a driven agitator system capable of producing a vortex in a liquid contained within the reactor, and (2) an inlet line for admitting carbon dioxide discharging above a vortex produced by the agitator system. Optionally the apparatus can include (3) an inlet line for admitting reaction feed, (4) an outlet from the vapor space above the vortex for removing excess carbon dioxide, and (5) a discharge line for reaction product.

In further embodiments of the invention apparatus is provided for mixing and supplying a mixed petroleum sulfonate reaction feed liquid which is made up of (1) petroleum sulfonate, (2) lube oil, (3) $Ca(OH)_2$, (4) MeOH, and (5) naphtha.

In still another embodiment of the invention the reaction product discharged from the reactor is subjected to recovery operations for removal of water and methanol, for filtering of solids, and for fractionation of naphtha so that a product of overbased petroleum sulfonate and lube oil is recovered.

This invention provides a process for producing a detergent-dispersive additive for motor oils by reacting carbon dioxide ($CO_2$) with lime ($Ca(OH)_2$) in the presence of methanol and simultaneously dispersing the resultant calcium carbonate ($CaCO_3$) in a 50/50 mixture of calcium petroleum sulfonate and a finished 100 neutral lube stock. The reaction is carried out in naphtha solvent. The product is then stripped of water and methanol, filtered to remove the solids and stripped of naphtha. The finished product is a colloidal dispersion of $CaCO_3$ in a range of about 20 to about 40 weight percent usually about 27 weight percent in the 50/50 calcium petroleum sulfonate/100 neutral lube oil stock mixture.

The petroleum sulfonates useful in the present invention can be described as neutral petroleum sulfonate prepared by sulfonating KC250 bright stock having viscosity of 200 SUS at 210° F. (See U.S. Pat. No. 3,135,693 incorporated here by reference).

The neutral lube oil useful in this invention can be described as solvent refined 100 neutral lube oil stock having viscosity of 100 SUS at 100° F.

The lime, calcium hydroxide, useful in the present invention can have a surface area of about 5 to about 50 $M^2/g$. The lime is not soluble in the reaction mixture and is of sufficient density to tend to settle rapidly. A preferred hydrated lime or slaked lime $Ca(OH)_2$, is Kemilime manufactured by Ash Grove Cement Co., Kansas City, Mo.

The methanol (MeOH) useful in this invention as promoter/solvent is described as methanol having 0 to about 10 weight percent $H_2O$.

The naphtha used in this invention is described as petroleum naptha having boiling point range of about 80° to about 300° C.

The $CO_2$ useful in this invention is described as technical grade or chemically pure $CO_2$.

General reaction conditions to make overbased product having 300 total base number (defined as Mg.KOH equivalent/gram product) are as follows: The temperature for the carbonation reaction can range from 25° C. (77° F.) to 80° C. (176° F.), preferably 35° C. (95° F.) to 65° C. (149° F.). Pressure of the carbonation reaction can range from 1 psia to 30 psia, preferably 10 to 20 psia. The overbasing (carbonation) residence or reaction time can vary from 20 minutes to 120 minutes, preferably 50 to 70 minutes overall.

Feed component concentrations for the carbonation reaction are as follows:

| Component | Weight % of Total Feed | |
|---|---|---|
| | In General | Preferred |
| Carbon Dioxide ($CO_2$) | 2.0 to 10 | 4 to 7 |
| Hydrated Lime ($Ca(OH)_2$) | 5.0 to 20 | 10 to 15 |
| Neutral Oil (Calcium (Petroleum Sulfonate) | 5.0 to 15 | 7 to 12 |
| No. 10 Lubricating Oil Stock | 5.0 to 15 | 7 to 12 |
| Naphtha | 30.0 to 80.0 | 50 to 70 |
| Methanol | 2.0 to 10.0 | 3 to 7 |

The $CO_2$ is added as a vapor, lime as a solid and the rest of the components as liquids. In addition up to 1.0 weight percent water can be added in the feed and still achieve 300 total base number. Initial water concentrations greater than 1.0 weight percent, however, can be detrimental by reducing the base number of the product.

The essential element of this invention is a reactor tank with a low shear agitator that is sized to produce a vortex in the liquid which the tank contains. To use this vortex efficiently, according to the invention, the carbon dioxide enters the reaction chamber in the vapor space above the vortex at a point above the vortex that has been created. The entering feedstock and carbon dioxide are believed to enter into intimate contact on the surface of the vortex as the feedstock is blended into the liquid in the reactor.

The process of this invention can best be understood in conjunction with the drawing which is a schematic representation of an apparatus employing the method of the present invention.

Referring now to the drawing, lime through line (1), 100 neutral lube stock through line (3), petroleum sulfonate through line (5), and naphtha through line (7) are combined as feedstock in line (9) and passed into stirred feed tank (11). In the feed tank an agitator blade (13) attached by shaft (15) to a motor (17) provides agitation so that a consistently homogeneous reaction feedstock can be passed through line (19), pump (21) and line (23) into a stirred vortex tank reactor (25) which is a closed tank containing an agitator system, here made up of an agitator blade (27), shaft (29) and motor (31), which provides sufficient agitation to create a vortex (33) at the surface of the reaction liquid (35) in tank (25).

For the purpose of illustration a reaction is carried out according to this invention in which reactor (25) is a 4.5 gallon batch reactor maintained at a temperature of 48°–50° C. into which a reaction mixture is discharged below the liquid level (33) from the outlet of line (23). The reaction mixture contained 10.6 pounds of lime, 9.0 pounds of 100 neutral lube stock, 6.0 pounds of petroleum sulfonate, 8.5 pounds of naphtha, 0.4 pounds of methanol, and 0.8 pounds $H_2O$ which had been produced as an agitated, homogeneous mixture. In the mixture, the weight ratio of lime to petroleum sulfonate was 1.77 and the weight ratio of petroleum sulfonate to 100 neutral lube stock was ⅔.

Carbon dioxide was admitted through line (37) to discharge above the vortex surface (33) within the vapor space (39) of reactor (25). Excess gaseous material was removed through off-gas line (41) from the vapor space. Reactor product was removed through line (43), pump (45) and line (47) into collection tank (49).

The reactor product can be recovered by a process that is not part of the present invention, but is described as follows:

The reaction product is stripped of water and methanol, filtered to remove the solids and stripped of naphtha. The finished product is a colloidal dispersion of $CaCO_3$ in a range of about 20 to about 40 weight percent usually about 27 weight percent in 50/50 calcium petroleum sulfonate/100 neutral oil mixture.

In general, the stripping of water and methanol is a well known fractionation in which the following operating conditions are met: At least one or more stages of stripping with steam, nitrogen or other inert gas except $CO_2$ at a maximum of about 250° F. at preferably atmospheric pressure. The methanol/$H_2O$ content of the bottoms product from this stripping step should be at least less than 0.3 weight percent for best filterablility.

The filtering of the product from which water and methanol has been removed is carried out by a filtering procedure, such as, perferably a vacuum filtration using a rotary precoated filter, the precoat consisting of diatomaceous earth or the like. This filtration is most effectively carried out between 180°–220° F. and about 12–15 inches Hg up to 26–28 inches Hg vacuum.

The removal of naphtha from the filtered product is accomplished by well known fractionation processes under operating conditions that include: An atmospheric packed or trayed tower which removes 80% of the naphtha followed by a vacuum fractionation to distill overhead the remaining naphtha while preventing the loss of the light ends of the 100 neutral lube oil stock.

Table I below reports the product discharged from line (47) as the run progressed showing the amount of carbon dioxide reacted over a period of time and showing that a constantly increasing TBN was produced until a clear product having a TBN above 300 was obtained.

TABLE I

(VORTEX MODE)

| Total CO₂ Reacted (Liters) | Total Elapsed (Min.) | TBN | Hazy/Clear |
| --- | --- | --- | --- |
| 59 | 18 | 147 | clear |
| 84 | 25 | 204 | clear |
| 125 | 36 | 265 | clear |
| 153 | 44 | 293 | clear |
| 182 | 57 | 299 | clear |
| 202 | 62 | 317 | clear |
| 214 | 68 | would not filter | — |
| 242 (stop) | 78 | would not filter | — |

In a run that is not according to the process of this invention both the reaction feedstock and the carbon dioxide were sparged below the liquid level in reactor (25) with all other variables held as nearly constant to those described above as is possible. The results shown in Table II below described the product of the run as time elapsed as never having an acceptably high TBN and providing a product that was too hazy to be acceptable.

TABLE II

(DIRECT SPARGE)

| Total CO₂ Reacted (Liters) | Total Elapsed Time (Min.) | TBN | Hazy/Clear |
| --- | --- | --- | --- |
| 80 | 21 | 177 | clear |
| 120 | 33 | 236 | hazy |
| 150 | 42 | 229 | hazy |
| 180 | 50 | 220 | hazy |
| 200 | 56 | 96 | hazy |
| 210 | 59 | would not filter | |
| 240 | 66 | would not filter | |

I claim:

1. A method for producing overbased petroleum sulfonate comprising contacting $CO_2$ at reaction conditions of carbonation reaction temperature in a range of about 25° C. to about 80° C., of carbonation reaction pressure in a range of about 1 psia to about 30 psia, and of reaction time in a range of about 20 minutes to about 120 minutes, with a reaction mixture of (1) petroleum sulfonate, (2) solvent refined 100 neutral lube oil stock, (3) $Ca(OH)_2$, (4) MeOH, and (5) naphtha in the vapor space at the vortex surface of a stirred tank vortex reactor.

2. A method of claim 1 wherein said reactants are present as weight percent of the total feed in an amount of carbon dioxide in a range of about 2 to about 10, of petroleum sulfonate in a range of about 5 to about 15, of solvent refined 100 neutral lube oil stock in a range of about 5 to about 15, of $Ca(OH)_2$ in a range of about 5 to about 20, of MeOH in a range of about 2 to about 10, and of naphtha in a range of about 30 to about 80.

3. A method of claim 2 wherein said reaction conditions are in a range of carbonation reaction temperature of about 35° C. to about 65° C., of carbonation reaction pressure in a ranges of about 10 psia to about 20 psia, and of reaction time in a range of about 50 minutes to about 70 minutes overall.

4. A method of claim 3 wherein said reactants are present in weight percent of the total feed in a range of carbon dioxide of about 4 to about 7, of petroleum sulfonate in a range of about 7 to about 12, of solvent refined 100 neutral lube oil stock in a range of about 7 to about 12, of $Ca(OH)_2$ in a range of about 10 to about 15, of MeOH in a range of about 3 to about 7, and of naphtha in a range of about 50 to about 70.

* * * * *